Sept. 20, 1949.   H. D. HAGSTRUM   2,482,173
TEST CIRCUIT

Filed Nov. 8, 1944   3 Sheets-Sheet 1

INVENTOR
H.D. HAGSTRUM
BY
Franklin Mohr
ATTORNEY

Sept. 20, 1949.  H. D. HAGSTRUM  2,482,173
TEST CIRCUIT

Filed Nov. 8, 1944  3 Sheets-Sheet 2

INVENTOR
H.D. HAGSTRUM
BY
Franklin Mohr
ATTORNEY

Sept. 20, 1949.  H. D. HAGSTRUM  2,482,173
TEST CIRCUIT

Filed Nov. 8, 1944  3 Sheets-Sheet 3

INVENTOR
H. D. HAGSTRUM
BY
Franklin Mohr
ATTORNEY

Patented Sept. 20, 1949

2,482,173

UNITED STATES PATENT OFFICE 2,482,173

TEST CIRCUIT

Homer D. Hagstrum, New York, N. Y., assignor to Bell Telephone Laboratories, Incorporated, New York, N. Y., a corporation of New York Application November 8, 1944, Serial No. 562,514

4 Claims. (Cl. 175—183)

1

This invention relates to test circuits and equipment, particularly for use at high frequencies or with microwaves.

A feature of the invention is a particular placing and manner of connection of a resonant element and a detector in a transmission system, to assure that the resonant indication at the detector shall appear at a frequency of resonance of the resonant element alone and, in general, to assure that the detector shall indicate a true resonance in the portion of the system that is being tested for resonance.

It is found desirable in the manufacture of microwave apparatus, such as magnetrons, to practice quantity production of resonators which when each is finally operated in a complex organization such as a magnetron and its load circuit, will have its operating frequency uniformly confined to a very narrow band of frequencies. Quantity production of the resonators under strict frequency requirements is made difficult by the necessity for machining intricate and relatively small resonating cavities, as in anode blocks for use at very short wavelengths of the order of one centimeter, more or less. It has been found practically necessary to adopt a procedure of pretuning at some stage of the processing prior to sealing the anode block into a vacuum-tight structure comprising the finished magnetron.

To effect pretuning, it has been customary to couple a partially assembled magnetron containing the anode block into a transmission system, the latter commonly comprising a wave guide transmission line electrically long with respect to the wavelength at the operating frequency. It has been found that resonance measurements carried out in such a transmission system are dependent for their accuracy and reliability upon such considerations as the position of a calibrated wavemeter and an indicating detector with respect to the transmission system as a whole and to the relative position of the detector and the anode block. The properties of an electrically long transmission line are such that when reflected waves are present, which condition is generally not entirely avoidable in resonance measurements, standing or creeping wave patterns appear upon the transmission line and a point of maximum voltage or maximum current will shift along the line when the operating frequency is varied. If a detector is situated in the line at any given point where it is exposed to the shifting of the wave pattern, a maximum or minimum indication will be obtained in the detector when the maximum or minimum intensity of a creep-

2 ing wave passes the detector. The detector then gives an indication of resonance which depends not alone upon resonance of some element connected to the system but also upon the position of the detector in the transmission line. Furthermore, if a wavemeter is coupled to the transmission system through a branch transmission line, the resonant frequencies of the branch system will depend not alone upon the resonance of the wavemeter but also to some extent upon the reactances comprising the branch line.

In accordance with the invention, an element to be tested for resonance may be connected to a source of waves through a transmission line of any desired length. A detector is coupled to the transmission line in order to give an indication when the resonator is tuned to the frequency of the source. A wavemeter is also coupled to the system either to absorb or reject energy at a known frequency. To avoid false indications of resonance due to the effect of wave patterns on the transmission line, which change their position as a function of the frequency, the detector is placed close to the resonator under test and the wavemeter is coupled directly to the main transmission line with a negligible length of stub line.

Figure 1:
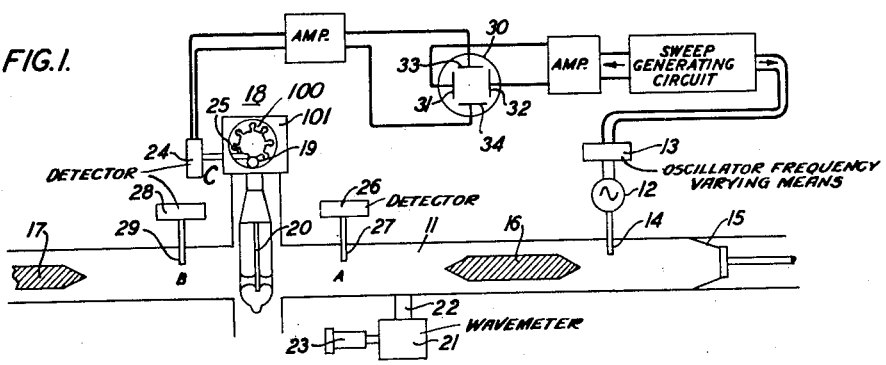
Figs. 1, 2 and 3 are schematic diagrams, useful in explaining the invention.
Figure 10:
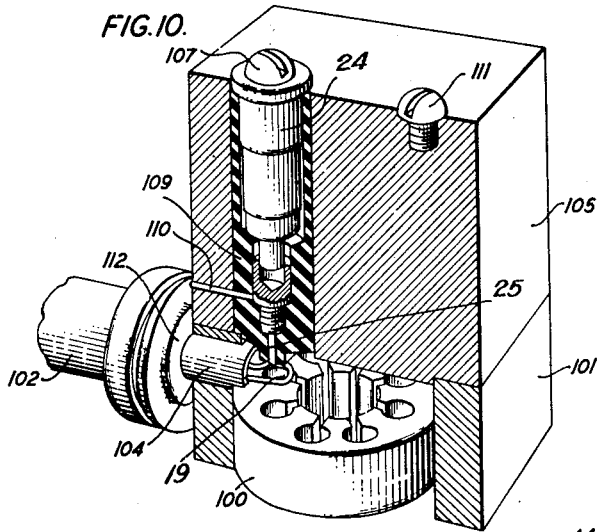
Fig. 10 is a perspective view, partly in section, showing an organization of detector, transmission line and resonant element to be tested, in accordance with the invention.

In Fig. 1, there is shown schematically a transmission line 11 such as a length of wave guide. A test oscillator 12 equipped with frequency varying means represented diagrammatically at 13 is coupled into the wave guide or transmission line at a suitable point by means of a probe or antenna 14. An adjustable reflector 15 is preferably placed at a suitable distance from the probe 14 to reflect the energy propagated in one direction and cause it to reinforce the energy propagated in the other direction, in accordance with common practice. An attenuator 16 may be provided between the probe 14 and the equipment to be tested, in order to provide general reduction of the effect of standing waves. The transmission line may be suitably terminated at the end remote from the antenna 14 by another attenuator or terminating impedance device 17. The apparatus to be tested for resonance is represented diagrammatically at 18 and preferably contains an output coupling device 19 connected to a probe or antenna 20, the elements 18, 19 and 20 comprising, if desired, a partially assembled structure, such as an anode insert 100 of a magnetron in a container 101 (Figs. 1 and 10). The probe 20 is connected to the output coupling 19 and serves to couple the device 18 into the transmission line 11 for purpose of test. A wavemeter 21 is connected to the line 11 through a coupling device 22, the wavemeter being adjustable as to frequency by means shown diagrammatically at 23. A cavity resonator containing a coupling loop or probe therein is advantageously employed as a wavemeter.

For convenience in explaining the operation of the invention, detectors are shown in three alternative positions in Fig. 1. A detector 24, with a probe 25 extending into the device 18 to a point close to the coupling element 19, is shown as in the preferred position in accordance with the invention. A detector 26 with a probe 27 and another detector 28 with a probe 29 are shown in more or less undesirable positions, not in accordance with the invention. For convenience, the detector 26 will be referred to as being at position A, the detector 28 at position B and the detector 24 at position C. Other positions may be found, but those shown represent typical conditions.

Figure 5:
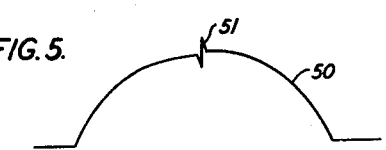
Figs. 5, 6 and 7 are oscillograms obtained from a test circuit under varying conditions.
Figure 6:
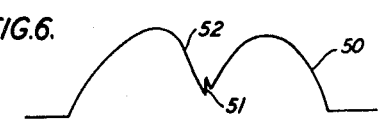
Figure 7:
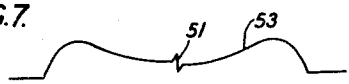

An oscilloscope 30 may be provided for observing results of tests in the system as the frequency of the oscillator 12 is varied. The frequency varying device 13 may be actuated as by an electrical sweep generating circuit connected through an amplifier, if desired, to the horizontal deflection producing plates 31 and 32 of the oscillograph, and the detector may be connected, as through an amplifier, to the vertical deflecting producing plates 33 and 34 as shown. With proper adjustment, the oscilloscope 30 will show a representation of the detector response as a function of the oscillator frequency. If there is no frequency sensitive element in the system, the pattern observed in the oscilloscope 30 will be such as that shown on Fig. 5 to take a representative case. The curve 50 in Fig. 5 indicates the frequency response of the detector over the tuning range of the oscillator 12. Here the sweep has been adjusted to include oscillation frequencies of a selected mode among several modes developed in the oscillator. With the wavemeter 21 in the system, if the resonance of the wavemeter lies in the range of the oscillator, some sort of disturbance or pip 51 is observed upon the curve 50 at some particular frequency. A wavemeter with a high value of Q will give a sharp disturbance extending over only a very narrow frequency range as illustrated in Fig. 5. When a resonant device of a lower Q is present, such, for example, as the device 18, a pattern, such as shown in Fig. 6, will be observed. Here the pip 51 is shown superimposed upon a broader indication 52, produced by the device of lower Q and extending over a wider frequency range. Fig. 6 shows the pip 51 adjusted to the center of the indication 52. A resonant indication of still lower Q is shown in Fig. 7 where a broad indication 53 appears with the pip 51 superimposed.

The system of Fig. 1 may be used as in the following manner. The element 18 to be tested or pretuned is inserted as shown and the oscillator 12 is adjusted to vary over a desired range of frequency. The wavemeter 21 may be set by means of the adjustment 23 to a desired frequency to which the element 18 is to be adjusted. A figure such as shown in Fig. 6 may then be observed in the oscilloscope 30. If the pip 51 does not coincide with the center of the indication 52, the latter indication being due to the element 18, a slight adjustment may be made in the element 18 to obtain the desired resonance. This adjustment may be made, for example, by bending the coupling element 19 thereby raising or lowering it or otherwise changing its position with respect to other portions of the resonant element of the device 18.

Figure 4:
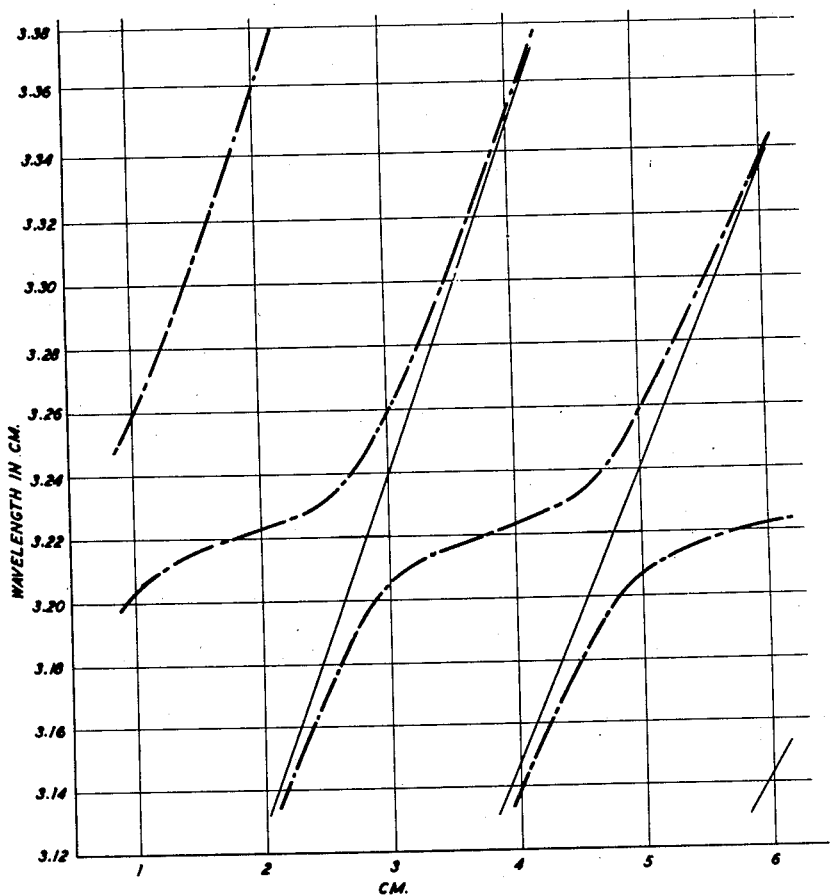
Fig. 4 is a graph representing measurements made with a detector in various positions along a transmission line containing a resonant element.

With the detector at position A or at position B, it will generally be possible to find two indications of resonance, both of which depend upon the resonant characteristics of the device 18 under test. The fact of this dependence may be checked by inserting into the resonator some element to alter the resonant frequency. For example, a glass rod may be inserted into a resonant cavity of the device 18 to decrease the frequency of the resonance or a metal rod may be inserted to increase the frequency. It is found that if the detector is in position A, the resonant frequencies observed will depend upon the position of the detector if the detector is placed at different distances. A representative set of measurements is shown in Fig. 4 in which the abscissa represents the distance of the detector probe 27 from an arbitrary reference point on the transmission line 11 and the ordinate represents the wavelength of resonance as shown by the calibrated adjustment 23. The data for Fig. 4 were taken in the following manner. With the detector 26 at a certain position a search was made over the range of the oscillator 12 and the frequencies of all resonance indications were observed. Then the detector was moved along the line 11 a short distance and the process repeated. Fig. 4 shows that at each detector position two or even three resonant frequencies were observed. In the vicinity of the points of inflection of the curves in Fig. 4, the resonance appeared to have a higher value of Q than near the asymptotic portions of the curves. In the former case the resonance indication looked like Fig. 6 and in the latter case like Fig. 7. It was also noted that if the coupling device 19 was moved slightly the curves as observed in Fig. 4 were shifted both horizontally and vertically.

It was also found that when the amount of intrusion of the probe 20 into the wave guide was changed, curves of the same nature as in Fig. 4 were obtained except that they were shifted parallel to the axis of abscissas.

Experiments made with the detector at the position B are found more satisfactory than those taken at position A in respect to dependence upon the position of the detector. In position B the resonances observed are independent of the position of the detector as well as the nature of the termination 17 of the line in which the detector is placed provided that the termination 17 is not frequency sensitive in the range of frequencies explored. The resonances at position B do depend, however, on the adjustment and position of the coupling element 19, the degree of intrusion of the probe 20 into the wave guide, and the disposition of conductors and dielectrics in the vicinity of the probe 20.

In accordance with the invention, the detector is placed at position C, in which position the detector is essentially inside the resonator 18 with practically zero line length intervening. The probe 25 is preferably placed in the immediate vicinity of the coupling device 19. With this arrangement, only a single resonance indication is observed and this is independent of all the various parameters which are found effective to disturb the resonance indications at positions A and B. The frequency of resonance observed at position C is found always to be that of the point of inflection of the curves of Fig. 4 and in good agreement with the actual operating frequency of the device when finished and incorporated into a microwave system in which the device is intended to operate.

Figure 2:
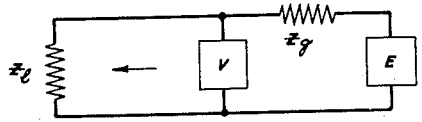

The disturbing effects upon resonance measurements as exhibited in Fig. 4 are bound up with the electrical line length existing between the resonator under test and the detector. In what follows the theory of the circuit is discussed in terms of equivalent circuit elements which represent the resonator under test with sufficient accuracy for the present purpose. It is assumed that the resonator 18 has an infinite value of Q when unloaded. This assumption is found to have no effect upon validity of the calculations nor upon the generality of the conclusions, but permits of the definition of a resonance as a zero in the impedance at the detector looking into the device under test through the output coupling device, thereby simplifying the mathematical treatment. The response of the detector, however, depends on the impedance characteristic of the remainder of the circuit, and the output elements such as 19 and 20 must be considered together with the characteristics of the line 11 and the various other elements coupled thereto. Assuming the detector to be frequency insensitive, it responds to the electric field at the probe 25, which field is a function of a voltage V as shown in the equivalent circuit of Fig. 2. In Fig. 2, $Z_l$ is the impedance at the detector looking in the direction of energy flow, $Z_g$ the impedance of the rest of the circuit looking toward the oscillator, E the oscillator electromotive force and V the voltage to which the detector responds. Each of these quantities is a more or less sensitive function of the frequency as may be expressed in the following equation:

$$V(f) = E(f) \frac{Z_l(f)}{Z_l(f) + Z_g(f)} = \frac{E(f)}{1 + Z_g(f)/Z_l(f)} \quad (1)$$

It is of interest here to determine the resonant frequency of the resonator under test which is a part of the circuit contributing to $Z_l$ and it is desired to study the frequency sensitivity of $Z_l$ independent of any frequency sensitivity of $Z_g$ and E. The effect of frequency sensitivity of E and $Z_g$ may be examined by replacing $Z_l(f)$ with a broad band load $Z_0$ independent of frequency. The voltage to which the detector will respond then becomes:

$$V(f) = \frac{E(f)}{1 + Z_g(f)/Z_0} \quad (2)$$

The frequency sensitivity of $Z_g$ may also be tested experimentally by inserting a suitable broad band load $Z_0$ in place of the device to be tested. In this case the detector response observed is as shown in Fig. 5. Since in the arrangement of Fig. 1 the attenuator 16 is placed between the detector and the oscillator probe 14 to make $Z_g(f)$ very nearly constant at the value $Z_0$, this response is primarily an indication of the output of the oscillator 12 as a function of frequency.

The dependence of the output upon the frequency is a minimum at the top of the curve 50 where the curve is substantially horizontal. Thus when $Z_0$ is replaced by $Z_l(f)$ and a zero of this function lies in the frequency range of the oscillator 12, the effect of frequency sensitivity of E and $Z_g$ may be minimized if this range is adjusted to make the perturbation of $Z_l(f)$ come at the frequency of the top of the curve 50. The response curve is then of the type shown in Fig. 6. Accuracy of resonance indication is promoted by taking the precaution of adjusting to a symmetrical pattern as nearly as possible, although the frequency indicated by the bottom of the dip 52 in Fig. 6 has been investigated and is found to change very little as a function of its position on the broad response curve 50.

Figure 3:
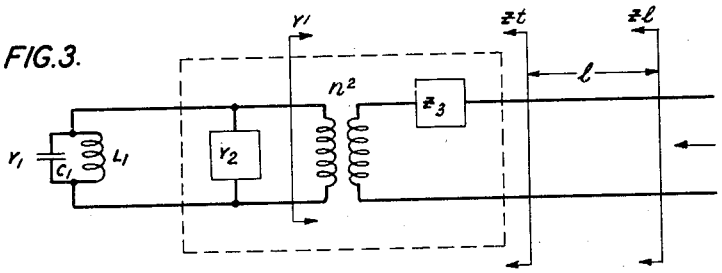

The device 18 to be tested is assumed to have no internal loss and to be coupled to the line 11 through an ideal transformer. A suitable equivalent circuit is shown in Fig. 3 in which $Y_1$ represents the admittance of the device under test, $Y_2$ the admittance of the output coupling elements shunting the device itself, $n^2$ is a real number or multiplier in the nature of a turns ratio of a transformer, and $Z_3$ represents a series reactance. $Y_1$ and $Y_2$, being in parallel, and $Y_2$ being assumed a pure reactance, the two admittances are indistinguishable in practice and may be lumped together as Y which is considered composed of a generalized LC. The resonant frequency of the combination Y will be somewhat displaced from that of $Y_1$ alone.

The impedance looking into the circuit of Fig. 3 will depend upon the position in the line 11 from which the impedance measurement is made. If $Z_t$ represents the impedance measured close up to the terminating circuit and $Z_l$ is reserved to represent the impedance at a distance $l$ toward the oscillator, well-known transmission theory gives the following relationship:

$$Z_l = Z_0 \frac{(Z_t + jZ_0 \tan \beta l)}{(Z_0 + jZ_t \tan \beta l)} \quad (3)$$

where $\beta$ is the phase shift characteristic of the line 11. The impedance $Z_t$ may be expressed as follows:

$$Z_t = jX_3 + (n^2/Y) \quad (4)$$

where $X_3$ takes the place of $Z_3$ considering this impedance to be a pure reactance. From these equations it is readily possible to extract a relation between $l$ and the frequency such as to make $Z_l$ equal zero. For, when $Z_l$ equals zero we have, $Z_t$ equal to the negative of $jZ_0 \tan \beta l$ and $$jX_3 + (n^2/Y) = -jZ_0 \tan \beta l = -jZ_0 \tan (\omega l/c) \quad (5)$$

Now from the theory of resonant circuits in the absence of resistance, $$Y = j\left(\omega C - \frac{1}{\omega L}\right) = jY_0\left(\frac{\omega}{\omega_0} - \frac{\omega_0}{\omega}\right) \quad (6)$$

where $Y_0 = \sqrt{C/L}$ = characteristic admittance of resonator and $\omega_0 = \frac{1}{\sqrt{LH}}$ = resonant angular frequency Inserting these relations into Equation 5 and transposing terms $$\frac{n^2}{Y_c\left(\frac{\omega}{\omega_0} - \frac{\omega_0}{\omega}\right)} = X_3 + Z_0 \tan (\omega l/c) \quad (7)$$

The relation of $\omega$ and $l$ given by (7) is not seriously affected if the constant $X_3$ is neglected. Interest may then be centered upon the following expression:

$$\frac{n^2}{Y_0\left(\dfrac{\omega}{\omega_0}-\dfrac{\omega_0}{\omega}\right)}=Z_0 \tan (\omega l/c) \qquad (8)$$

which may be written $$l=\frac{\lambda}{2\pi}\left(\operatorname{arccot}\left[\frac{Y_0 Z_0}{n^2}\left(\frac{\omega}{\omega_0}-\frac{\omega_0}{\omega}\right)\right]+m\pi\right) \qquad (9)$$

$m$ being an integer.

Figure 8:
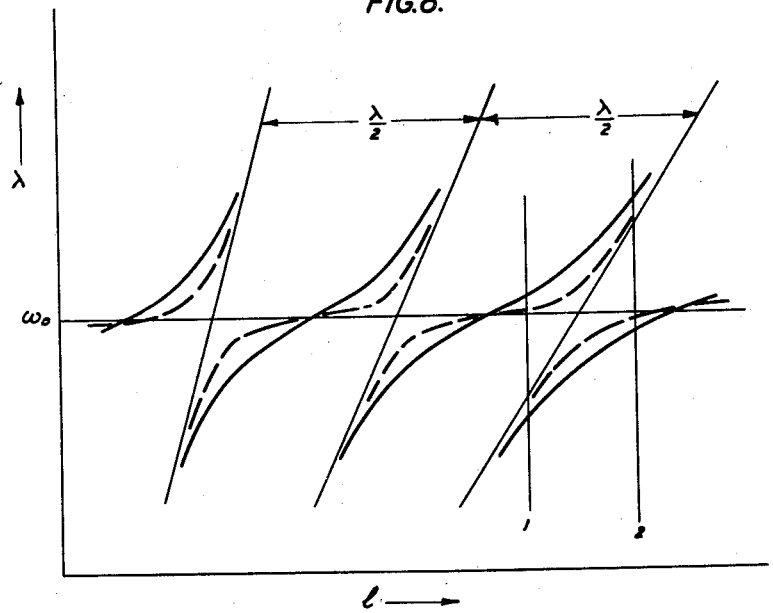
Fig. 8 shows theoretical curves simulating measurements such as are shown in Fig. 4.

This relation gives the several positions along the line at which the impedance is zero as a function of frequency. For frequencies far from $\omega_0$ where the arc cotangent term is essentially constant the equation represents a series of straight lines spaced $\lambda/2$ apart as shown in Fig. 8. The slope of any particular line depends on the equivalent number of half wavelengths to the end of the line. In the vicinity of $\omega_0$ the curves cross from one asymptote to another and have the general shape shown in Fig. 8. The point of inflection comes at $\omega_0$ at which point the slope depends on the quantity $Y_0Z_0/n^2$. The solid curve is for a large value of $n^2$ and the broken curve for a small value of $n^2$. The quantity $Y_0Z_0/n^2$ can be shown to be directly proportional to the loaded Q or inversely proportional to the tightness of coupling from the line 11 into the resonator 18. Tightness of coupling is in turn inversely proportional to the distance between the coupling element 19 and the resonator 18.

It is seen that the experimental curves of Fig. 4 correspond closely to the curves shown in Fig. 8.

Figure 9:
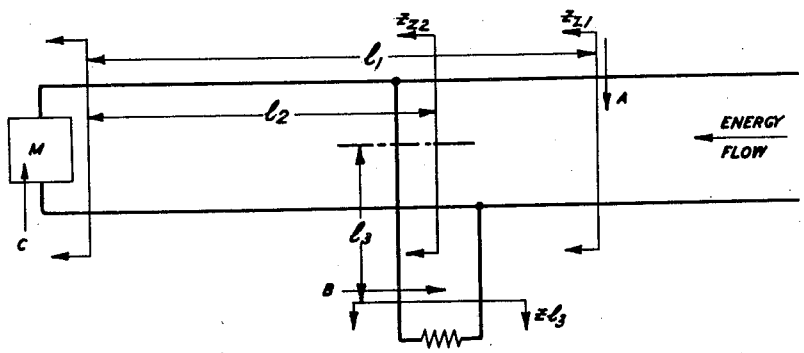
Fig. 9 is a schematic circuit diagram useful in explaining the invention.

The arrangement of Fig. 1 may be further investigated by means of an equivalent circuit shown in Fig. 9. The theory as presented hereinbefore applies directly to the detector at position A. Part of the length $l_1$ is in the output coupling elements of the resonator 18 and in the probe 20 which elements may vary from one resonator to another, and part is in the line 11.

At position B, however, conditions are somewhat different. The detector is at a point on a branch line looking into a frequency insensitive load $Z_{13}$, produced by the terminating attenuator 17. The branch line is fed by the voltage at the point distant $l_2$ on the main line which voltage depends on $Z_{12}$ as shown in Fig. 9. Thus in effect the response to the detector in the branch line is the same as if the detector were placed in the main line at a distance $l_2$ from the end. The response is independent of position along the branch line as well as of the termination $Z_{13}$ provided the branch line and its termination are frequency insensitive. It may be noted here that any reflection of waves on a line or any impedance mismatch results in some degree of frequency sensitivity. Also, any change in attenuation as a function of frequency produces a certain amount of frequency sensitivity.

The response of the detector at position B has been found to be dependent upon the line length $l_2$ and this dependence may be exhibited as by varying the degree of protrusion of the probe 20 into the line 11.

The junction of the branch line and the main line occurs in a region of a change from coaxial conductor to wave guide in the case illustrated in Fig. 1. The electrical line length $l_2$ is dependent not only on the physical line length involved but also on the disposition of dielectric material and conductors in the vicinity of the junction. These considerations explain the dependence of resonances seen at B upon the position of the probe 20, and upon associated insulators and openings in the wave guide.

When the detector is arranged to pick up energy near the coupling element 19 (position C) the whole of the circuit on the generator side of the detector enters into the response only through the quantities $Z_g$ and $E$ of Fig. 2 and Equation 1. The dip 52 in the response curve of the detector as shown in Fig. 6 will then correspond closely to $\omega_0$ at the points of inflection of the curves for position A.

The reason for differences in the apparent Q of the response near to and far from $\omega_0$ is apparent from the theory given. Far from $\omega_0$ the resonance is that of a line short-circuited at one end and loaded with its characteristic impedance at the other. This combination has a very low Q of the order of $4l$ where $l$ is measured in wavelengths. Near $\omega_0$ the Q of the line and resonator combination approaches that of the resonator alone, which is considerably higher, being of the order of 200 in a representative case.

If the relation of the coupling element 19 and the resonator 18 is changed this appears as a change not only in the coupling factor $n^2$ but also as changes in the amount of reactance with which the resonator is loaded and in the equivalent line length between the element 19 and the end of the probe 20. These changes adequately account for the shifts observed in the point of inflection in measurements similar to those shown in Fig. 4. If the resonant frequency $\omega_0$ is changed as by means of a tuning adjustment in the device 18, one will expect to find a shift of the points of inflection not only along the $\omega$ axis but along the $l$ axis as well in accordance with the theory.

The theory also has a bearing upon the proper mode of insertion of the wavemeter 21 and upon the nature of a suitable coupling device 22. The position of the wavemeter 21 with reference to the detector at position A is analogous to that of the device 18 with regard to the detector at position B. It is evident from the theory that the detector response 51 will occur at the frequency of resonance of the wavemeter 21 only if the coupling device 22 acts substantially as a direct coupling or a line of negligible length between the wavemeter 21 and the main line 11.

A suitable detector and probe for use at position C in testing partially assembled magnetrons is illustrated in Fig. 10. In that figure the anode insert 100 containing a plurality of resonant cavities is shown in place in the container 101 which is part of the magnetron assembly. An output coaxial coupling device is shown at 102 terminating in the coupling loop 19 extending into the interior of the container 101 through a sheath 104. In the finished magnetron, the container 101 is closed by means of upper and lower plates (not shown). In testing for resonance, one of the end plates may be replaced by a detector block 105 which has embedded therein the suitable detector or rectifier 24 as, for example, a silicon rectifier. One terminal of the rectifier is insulated from the block 105 and connection may be made thereto through a terminal such as a screw 107. The other terminal of the detector is connected to the probe 25 which may be insulated as by a polystyrene bushing 109. The probe 25 is preferably positioned close to the coupling loop 19 and perpendicular to the plane of the loop at its center. A conductive wire or rod 110 may connect the probe 25 with the block 105 to complete a direct current path through the detector from terminal 107 to a terminal 111, the rod 110 preferably being placed at a voltage node in the high frequency path between the probe 25 and the detector.

The placing of the detector close to the coupling loop 19 has the following advantages. It enables a relatively large amount of energy to be picked up so that the resonances may be indicated on an ordinary oscilloscope provided with only the customary amplifiers. The detector obtains its operating voltage essentially at zero line length from the resonator to be tested. The arrangement is conducive to the use of an absorption method of measurement as distinguished from a transmission method.

For use in the absorption method, the wavemeter requires an input coupling and no output coupling, the input coupling being coupled across the line without breaking the continuity of the line. For use in the transmission method, the wavemeter requires input and output couplings, the line being broken open and the input coupling of the wavemeter being coupled to the portion of the line nearest the source of waves and the output coupling of the wavemeter being coupled to the portion of the line nearest the detector.

In the absorption method, transmission occurs at all times whether the structure tested is near resonance or not. In a transmission method a response is not obtained unless resonance is secured enabling sufficient energy to reach the detector. Proper alignment of the probe 25 with respect to the loop 19 is readily assured by providing a flange 112 on the device 102 to bear against a flat side of the block 105. The presence of the probe 25 is found to produce negligible perturbation of the resonance of the anode insert 100 unless the probe is inserted through the loop and into the resonant cavity below.

What is claimed is:

1. Apparatus for testing a cavity resonator comprising a source of electromagnetic energy of variable frequency, a transmission line several wavelengths in extent in the frequency range of said source for connecting said source to said resonator, a detector, a probe connected to the input of said detector, means for mounting said detector with the said probe extending into said cavity resonator, indicating means connected to the output of said detector, and a wavemeter tuned to a frequency in the range of variations of said source connected across said transmission line at a point thereof intermediate between said source and said cavity resonator through substantially zero length of connecting line.

2. Apparatus according to claim 1 together with means to correlate the indicated variations in the output of the said detector with the variations in the frequency of said source.

3. Apparatus for testing a cavity resonator having a coupling loop therein, said apparatus comprising a source of electromagnetic energy of variable frequency, a transmission line several wavelengths in extent in the frequency range of said source for connecting said source to said coupling loop, a detector, a probe connected to the input of said detector, means for mounting said detector with the said probe extending into said cavity resonator adjacent to said coupling loop, indicating means connected to the output of said detector, and a wavemeter tuned to a frequency in the range of variations of said source connected across said transmission line at a point thereof intermediate between said source and said cavity resonator through substantially zero length of connecting line.

4. Apparatus for testing a cavity resonator comprising a source of electromagnetic energy, frequency varying means coupled to said source, a transmission line several wavelengths in extent in the frequency range of said source coupled to said source for connecting said source to said resonator, a detector having an input and an output, a probe connected to the input of said detector, means for mounting said detector with the said probe extending into said cavity resonator, an oscilloscope having a pair of beam deflecting means operable to deflect the beam thereof in first and second dimensions respectively, sweep generating means coupled to said frequency varying means and to the first of said beam deflecting means in order to vary the frequency of said source of energy of variable frequency and to deflect the beam of said oscilloscope in the first dimension in synchronism with the said frequency variation, the output of said detector being coupled to the second of said beam deflecting means in order to deflect the beam of said oscilloscope in the second dimension in accordance with the output of the detector, and an absorption type wavemeter tuned to a frequency in the range of variations of said source connected across said transmission line at a point thereof intermediate between said source and said cavity resonator through substantially zero length of connecting line.

HOMER D. HAGSTRUM.

REFERENCES CITED

The following references are of record in the file of this patent:

UNITED STATES PATENTS

| Number | Name | Date |
| --- | --- | --- |
| 2,106,768 | Southworth | Feb. 1, 1938 |
| 2,243,234 | Von Duhn | May 27, 1941 |
| 2,337,934 | Scheldorf | Dec. 28, 1943 |